United States Patent
Bezemer et al.

(10) Patent No.: US 8,470,725 B2
(45) Date of Patent: Jun. 25, 2013

(54) PROCESS FOR REGENERATING A CATALYST

(75) Inventors: Gerrit Leendert Bezemer, Amsterdam (NL); Stephen Nkrumah, Amsterdam (NL)

(73) Assignee: Shell Oil Company, Houston, TX (US)

( * ) Notice: Subject to any disclaimer, the term of this patent is extended or adjusted under 35 U.S.C. 154(b) by 357 days.

(21) Appl. No.: 12/969,082

(22) Filed: Dec. 15, 2010

(65) Prior Publication Data

US 2011/0143917 A1   Jun. 16, 2011

(30) Foreign Application Priority Data

Dec. 16, 2009  (EP) .................................... 09179378

(51) Int. Cl.
- *B01J 21/20* (2006.01)
- *B01J 23/90* (2006.01)
- *B01J 25/04* (2006.01)
- *B01J 27/28* (2006.01)
- *B01J 29/90* (2006.01)
- *B01J 31/40* (2006.01)
- *B01J 38/00* (2006.01)
- *B01J 38/48* (2006.01)
- *B01J 38/64* (2006.01)
- *B01J 38/66* (2006.01)
- *B01J 38/50* (2006.01)
- *B01J 38/12* (2006.01)

(52) U.S. Cl.
USPC .............. 502/26; 502/20; 502/22; 502/25; 502/29; 502/31; 502/38

(58) Field of Classification Search
USPC ...................................... 502/20–56
See application file for complete search history.

(56) References Cited

U.S. PATENT DOCUMENTS

| 2003/0144128 A1 | 7/2003 | Daage et al. | 502/23 |
| 2003/0144131 A1 | 7/2003 | Koveal et al. | 502/38 |

FOREIGN PATENT DOCUMENTS

| EP | 0268201 | 5/1988 |
| EP | 1472000 | 8/2003 |
| EP | 1478612 | 8/2003 |
| EP | 1480743 | 8/2003 |
| EP | 1480745 | 8/2003 |
| WO | WO03041860 | 5/2003 |
| WO | WO03064356 | 8/2003 |

*Primary Examiner* — Kaj K Olsen
*Assistant Examiner* — Jennifer Smith

(57) ABSTRACT

A process for regenerating one or more deactivated cobalt comprising Fischer-Tropsch catalyst particle(s), comprising the steps of: (i) oxidizing the catalyst particle(s) at a temperature between 20 and 400° C.; (ii) treating the catalyst particle(s) for more than 5 minutes with a solvent, which solvent comprises an amine, (iii) drying the catalyst particle(s); and (iv) optionally reducing the catalyst particle(s) with hydrogen or a hydrogen comprising gas. This process may be preceded by a step in which Fischer-Tropsch product is removed from the catalyst particle(s).

18 Claims, No Drawings

PROCESS FOR REGENERATING A CATALYST

This application claims the benefit of European Application No. 09179378.6 filed Dec. 16, 2009 which is incorporated herein by reference.

BACKGROUND OF THE INVENTION

The present invention relates to a process for regenerating a catalyst. The invention especially relates to a process for regenerating a catalyst in situ in a reactor tube. Furthermore, the invention relates to a process for ex situ regeneration of a catalyst. The catalyst is suitable for use in producing normally gaseous, normally liquid and optionally normally solid hydrocarbons from synthesis gas generally provided from a hydrocarbonaceous feed, for example a Fischer-Tropsch process. The invention further relates to the regenerated catalyst and the use thereof in Fischer-Tropsch processes.

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas). The synthesis gas is then fed into a reactor where it is converted in one or more steps over a suitable catalyst at elevated temperature and pressure into paraffinic compounds and water. The obtained paraffinic compounds range from methane to high molecular weight hydrocarbons. The obtained high molecular weight hydrocarbons can comprise up to 200 carbon atoms, or, under particular circumstances, even more carbon atoms.

Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebulated bed reactors.

Catalysts used in the Fischer-Tropsch synthesis often comprise a carrier based support material and one or more metals from Group 8-10 of the Periodic Table, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

One of the limitations of a Fischer-Tropsch process is that the activity of the catalyst will, due to a number of factors, decrease over time. A catalyst that shows a decreased activity after use in a Fischer-Tropsch process is sometimes referred to as deactivated catalyst, even though it usually still shows activity. Sometimes such a catalyst is referred to as a deteriorated catalyst. Sometimes it is possible to regenerate the catalyst. This may be performed, for example, with one or more oxidation and/or reduction steps.

It is one object of the present invention to provide an in situ process for regenerating a cobalt comprising Fischer-Tropsch catalyst in a reactor tube using a regeneration solvent which does not dissolve cobalt at low temperatures. The present invention especially relates to a process that can be used to regenerate fixed bed catalysts, such as pellets and extrudates larger than 1 mm, in situ in one or more tubes in a fixed bed Fischer Tropsch reactor. The present invention further especially relates to a process that can be used to regenerate an immobilised slurry catalyst in a reactor tube, preferably an immobilised slurry catalyst comprising one or more catalyst particles larger than 1 mm. Particles having a particle size of at least 1 mm are defined as particles having a longest internal straight length of at least 1 mm.

SUMMARY OF THE INVENTION

According to one aspect of the present invention, there is provided a process for regenerating one or more cobalt comprising Fischer-Tropsch catalyst particles in situ in a reactor tube, said catalyst particle(s) having been deactivated by use in a Fischer-Tropsch process, said process for regenerating comprising the steps of:
  (i) oxidising the catalyst particle(s) at a temperature between 20 and 400° C., preferably between 100 and 400° C., more preferably between 200 and 400° C.;
  (ii) treating the catalyst particle(s) for more than 5 minutes with a solvent, which solvent comprises an amine;
  (iii) drying and optionally heating the catalyst particle(s); and
  (iv) optionally reducing the catalyst particle(s) with hydrogen or a hydrogen comprising gas.

This process will be referred to as the "in situ process" in this document.

All steps of the process of this aspect of the invention are performed in the order of numbering. The process may comprise additional steps. All steps of this aspect of the process of the invention are performed in situ in a reactor tube. Preferably, the catalyst particle(s) has/have been deactivated by use in a Fischer-Tropsch process in a reactor tube, and all steps of this aspect of the process of the invention are performed in situ in the same reactor tube. This is advantageous, as it makes unloading and reloading of the deactivated catalyst redundant.

Another advantage of using an amine comprising solvent in step (ii) is that the solubility of cobalt in this solvent is low at room temperature. A further advantage of using an amine comprising solvent in step (ii) is that the solubility of metal, especially of iron, is low at room temperature. Hence, using the process of the invention a minimal amount of cobalt will be washed away and the solvent is suitable to be used in a metal reactor tube, especially in an iron comprising reactor tube.

According to another aspect of the present invention, the deactivated catalyst particle(s) is/are subjected to a treatment step after being unloaded from the reactor in which the catalyst particle(s) were deactivated by use in a Fischer-Tropsch process. The catalyst particle(s) is/are thus subjected to an ex situ treatment step.

Hence, there is provided a process for regenerating one or more cobalt comprising Fischer-Tropsch catalyst particles, said catalyst particle(s) having been deactivated by use in a Fischer-Tropsch process in a reactor tube, said process for regenerating comprising the steps of:
  (a) oxidising the catalyst particle(s) in the reactor tube at a temperature between 20 and 400° C., preferably between 100 and 400° C., more preferably between 200 and 400° C.;
  (b) unloading the catalyst particle(s) from the reactor tube;
  (c) treating catalyst particle(s) for more than 5 minutes with a solvent, which solvent comprises an amine;
  (d) drying and optionally heating the catalyst particle(s).

This process will be referred to as the "ex situ process" in this document.

With the processes according to the present invention, the activity of a deactivated cobalt comprising Fischer-Tropsch catalyst can be increased significantly.

DETAILED DESCRIPTION OF THE INVENTION

The processes of the current invention are suitable for fixed bed catalysts, slurry catalysts, i.e. powder like catalysts, and immobilised slurry catalyst, for example wire structures coated with catalyst material. The processes of the current invention are especially suitable for fixed bed catalysts and immobilised slurry catalysts.

Examples of suitable fixed bed catalysts are pellets and extrudates larger than 1 mm, which comprise cobalt and a refractory metal oxide as carrier material.

Examples of suitable immobilised slurry catalysts to which the process of the present invention can be applied are catalysts with a size larger than 1 mm which catalysts comprise a substrate and catalyst material.

The immobilised slurry catalyst may, for example, be in the form of a fixed structure (or arranged packing) such as gauze, corrugated sheet material that may or may not be perforated with holes, woven or non-woven structure, honeycomb, foam, sponge, mesh, webbing, foil construct, woven mat form, wire, ball, cylinder, cube, sphere, ovoid, monolith, or any combination of these.

The substrate acts as a support for the catalyst material that is located thereon. The substrate preferably comprises an inert material capable of withstanding conditions within the reactor. The substrate may, for example, comprise a refractory metal oxide and/or metal. Preferably the substrate comprises a metal, such as stainless steel, iron, or copper.

The catalyst material comprises a carrier and a catalytically active metal. Suitable carriers are refractory metal oxides, such as alumina, silica and titania, preferably titania. In the present invention, the catalytically active metal is cobalt.

In case the catalyst material comprises titania as carrier for the cobalt, preferably the amount of metallic cobalt is in the range of 10 to 35 weight % (wt %) of cobalt, more preferably in the range of 15 to 30 wt % cobalt, calculated on the total weight of titania and metallic cobalt.

The catalyst to be regenerated comprises cobalt and has been deactivated by use in a Fischer-Tropsch process. The activity of the deactivated catalyst preferably is at least 10% lower as compared to its initial activity when it was freshly prepared. The catalyst may be fully deactivated, i.e. having lost more than 90% of its initial activity. For some cases it may be advantageous to regenerate a catalyst when its activity has been reduced with at least 50%, more preferably at least 60%. For some cases it may be advantageous to regenerate a catalyst when its activity has been reduced with at most 90%, preferably at most 85%, more preferably at most 80%.

The catalyst preferably comprises cobalt and a carrier material for the cobalt. The carrier material preferably comprises a refractory metal oxide, such as alumina, silica, titania, and mixtures thereof, more preferably titania.

In one embodiment of the process according to the invention, the catalyst particle may be reduced with hydrogen or a hydrogen comprising gas after the oxidation step (i) and before the treatment step (ii) or (a). Such a reduction may result in a partially or fully reduced catalyst particle. During such reduction after step (i), some of the cobalt in the catalyst particle that is present as cobalt(II,III)oxide ($Co_3O_4$) is converted to cobalt(II)oxide (CoO) and/or to metallic cobalt (Co).

The solvent used in step (ii) of the in situ process or in step (c) of the ex situ process comprises an amine, which may be aliphatic or aromatic.

In one embodiment, the solvent used in step (ii) of the in situ process comprises an amine, provided that it is not ethylene diamine.

The solvent used in step (ii) of the in situ process or in step (c) of the ex situ process preferably comprises an aliphatic amine, which may have a primary, secondary or tertiary structure. More preferably the solvent comprises an aliphatic amine with a primary structure. Suitable primary aliphatic amines are amino alcohols and alkyl amines. Preferably, an alkyl amine is used. The alkyl amine contains linear, branched or cyclic alkyl groups. The alkyl group preferably contains from 1 to 6 carbon atoms, more preferably 1 to 4 carbon atoms. Suitable alkyl groups include methyl, ethyl, n-propyl, iso-propyl, n-butyl and iso-butyl.

The solvent used in step (ii) of the in situ process or in step (c) of the ex situ process more preferably comprises methylamine, ethylamine, propylamine, and/or butylamine. The propylamine may be n-propylamine or iso-propylamine. The butylamine may be n-butylamine or iso-butylamine. Most preferably, the solvent comprises methylamine.

The solvent used in step (ii) or (a) may additionally comprise water. The solvents used in step (ii) or (a) additionally comprises one or more chemical compounds from the group consisting of nitric acid, weak organic acids, ammonium salts, and alkyl ammonium salts.

Examples of suitable weak organic acids are carboxylic acids having the general formula R—(COOH)n wherein n is 1-3 and R represents a cyclic or aliphatic, saturated or unsaturated moiety that may be substituted with one or more nitro, amino, hydroxyl or alkoxyl groups. Specific examples of suitable acids include formic acid, acetic acid, citric acid, succinic acid, malonic acid, propionic acid, butyric acid, valeric acid, caproic acid, glutaric acid, adipic acid, lactic acid, benzoic acid, phtalic acid, salicylic acid, ascorbic acid, oxalic acid, carbonic acid, glycine, amino propionic acid, amino butanoic acid, and iminodiacetic acid, and mixtures thereof. Preferred weak organic acids are acetic acid, citric acid, carbonic acid, glycine, and iminodiacetic acid, and mixtures thereof, especially glycine.

Examples of suitable ammonium salts are ammonium salts of weak organic acids and mixtures thereof, especially ammonium salts of the above-listed weak organic acids and mixtures thereof. Examples of highly preferred ammonium salts are ammonium acetate and ammonium carbonate and a mixture thereof, especially ammonium carbonate.

Examples of suitable alkyl ammonium salts are mono-, di-, tri-, and tetra-alkyl ammonium salts and mixtures thereof, especially mono- and di-alkyl ammonium salts of the above-listed weak organic acids and mixtures thereof.

In a highly preferred embodiment, the solvent used in step (ii) of the in situ process or in step (c) of the ex situ process comprises a mixture of ammonium carbonate and methylamine, ethylamine, propylamine, and/or butylamine. More preferably, the solvent used additionally comprises water.

In a most preferred embodiment, the solvent used in step (ii) of the in situ process or in step (c) of the ex situ process comprises a mixture of ammonium carbonate and methylamine. More preferably, the solvent used comprises water and additionally to the water a mixture of ammonium carbonate and methylamine.

In case in step (ii) of the in situ process or in step (c) of the ex situ process a mixture of water, ammonium carbonate and methylamine is used, the weight ratio of methylamine to ammonium carbonate preferably is in the range of from 1:0.25 to 1:2, more preferably in the range of from 1:0.5 to 1:1. The weight ratio of ammonium carbonate to water preferably is in the range of from 1:0.5 to 1:4, more preferably in the range of from 1:1 to 1:2. The weight ratio of methylamine to water is preferably in the range of from 1:0.25 to 1:4, more preferably in the range of from 1:0.5 to 1:2.

Preferably at least 10 weight %, more preferably more than 20 wt %, of the cobalt in the catalyst particle that is treated in step (ii) or (c) is present as $Co_3O_4$. Preferably at most 99 weight %, more preferably less than 95 wt %, of the cobalt in the catalyst particle that is treated in step (ii) or (c) is present as $Co_3O_4$. Preferably less than 50 wt %, more preferably at most 40 wt % of the cobalt in the catalyst particle is cobalt (II), for example present as divalent oxide or divalent hydroxide.

Such a catalyst particle can normally be obtained when a Fischer-Tropsch catalyst particle which has been deactivated by use in a Fischer-Tropsch process is oxidated in step (i) or (a) by treating the catalyst particle with an oxygen-containing gas at a temperature between 20 and 600° C., preferably between 100 and 450° C., more preferably between 200 and 450° C., for about 12 hours. The oxygen containing gas may, for example, be pure oxygen, oxygen enriched air (preferably containing 25 to 70 volume % oxygen), air (containing about 21 volume % oxygen), or air diluted with inert e.g. with N2. Preferably the oxygen containing gas comprises 0.1 to 10 vol % $O_2$, more preferably 0.3 to 5 vol % $O_2$. In one embodiment, the catalyst particle is subjected to a reduction step after the oxidation step (i) or (a) and before the treatment step (ii) or (c).

While not wishing to be bound by any theory, it is believed that the solvent used in step (ii) dissolves a part of any Co, any CoO, and a small part of the $Co_3O_4$ present in the catalyst particle.

Step (ii) or (c) is preferably performed at a temperature between 5 and 90° C., more preferably at a temperature between 40 and 70° C., even more preferably at a temperature between 50 and 60° C. In some applications it may be beneficial to increase the temperature during the treatment. The duration of the treatment of step (ii) or (c) may be adjusted to the temperature at which it takes place. When step (ii) or (c) is performed at a relatively low temperature, for example between 35 and 40° C., the treatment may be performed for several days up to weeks. When step (ii) or (c) is performed at a temperature between 50 and 60° C., the treatment may need only about 4 hours. When step (ii) or (c) is performed at a relatively high temperature, for example between 70 and 80° C., the solvent may start to evaporate, which is less preferred.

In one embodiment of the present invention, the oxidation step (i), the treating step (ii), the drying step (iii), and the reduction step (iv) are performed in situ in the Fischer-Tropsch reactor tube. In a preferred embodiment the whole catalyst particle or all catalyst particles in the reactor tube is/are subjected to the oxidation step (i) and the reduction step (iv).

The whole catalyst particle or all catalyst particles in the reactor tube may be subjected to the treating step (ii). Alternatively, a part of the catalyst particle(s) may be subjected to the treating step (ii).

Preferably all catalyst particles in the reactor tube are subjected to the treating step (ii) in case the reactor tube comprises a slurry catalyst of which at least 90% of the particles is smaller than 1 mm, preferably smaller than 0.5 mm. This is especially preferred in case the reactor tube comprises a slurry catalyst of which 100% of the particles is smaller than 1 mm, preferably smaller than 0.5 mm.

In case the reactor tube comprises one or more fixed bed catalyst particles or one or more immobilised slurry catalyst particles, preferably a part of the catalyst particle(s) in the reactor tube is subjected to the treating step (ii). This is especially preferred when the particle or at least 30% of the particles is larger than 1 mm. Preferably 90% or less of the fixed bed or immobilised slurry catalyst particle(s) is treated for more than 5 minutes with a solvent, more preferably 85% or less, even more preferably 80% or less, still more preferably 65% or less, most preferably 55% or less. Preferably 20% or more of the fixed bed or immobilised slurry catalyst particle(s) is treated for more than 5 minutes with a solvent, more preferably 35% or more, even more preferably 45% or more.

In case the reactor tube comprises one or more fixed bed catalyst particles or one or more immobilised slurry catalyst particles, and a part of the catalyst particle(s) is subjected to the treating step (ii) in situ in the tube, the part of the catalyst particle(s) in the reactor tube that is subjected to the treating step (ii) preferably is located at the downstream end. Upstream and downstream are defined herein with respect to the flow of the syngas, i.e. the flow of the mixture of hydrogen and carbon monoxide, in a Fischer Tropsch reactor. Reference herein to the upstream end of the catalyst particle(s) is thus to the end of the catalyst particle(s) to which the syngas is supplied during Fischer Tropsch reaction. Reference herein to the downstream end of the catalyst particle(s) is to the other end.

In a preferred embodiment, 85% or less of the catalyst particle(s) is treated, preferably 65% or less, more preferably 55% or less, whereby the part of the catalyst particle(s) located at the upstream end is not or hardly subjected to the treating step (ii). Additionally, or alternatively, it is preferred that at least 20%, preferably at least 35%, even more preferably at least 45% of the catalyst particle(s) is treated, whereby the part of the catalyst particle(s) located at the downstream end is subjected to the treating step (ii). In a highly preferred embodiment, 35% to 85%, more preferably 45% to 65%, of the catalyst particle(s) is treated whereby the part of the catalyst particles located at the upstream end is not or hardly subjected to the treating step (ii) and the part of the catalyst particle(s) located at the downstream end is subjected to the treating step (ii).

In case the reactor tube comprises one or more fixed bed catalyst particles, preferably the treatment step (ii) is performed using a pore fill method. Pores of the carrier material of the catalyst particle(s) are filled with the solvent. Pores of the whole particle or of all particles in the tube may be filled with the solvent. In case a part of the catalyst particle(s) is subjected to the treating step (ii), pores of the part that is treated are filled with the solvent using a pore fill method.

With a pore fill method is meant a process in which most of the pores of the carrier material at the surface of one or more catalyst particles are filled with the solvent, whereas the particle(s) is/are not immersed in the solvent. Pore fill may be achieved by filling a reactor tube comprising the catalyst particle(s) to a certain level with the solvent, and in a next step removing the excess liquid. The excess liquid may, for example, be removed by letting it out at the bottom of the reactor tube. Preferably, a gas, most preferably an inert gas such as nitrogen, is let in the reactor tube to enhance the removal of the excess liquid. After removal of the excess liquid, solvent is still present in pores of the catalyst particles.

In case the reactor tube comprises one or more immobilised slurry particles, the treatment step (ii) may be performed using a pore fill method. Alternatively, all or a part of the catalyst particle(s) is/are fully immersed in the solvent during treatment step (ii). Hence, in that case the reactor tube comprising the immobilised slurry catalyst particle(s) is filled with solvent to a certain level, and the part to be treated is kept immersed in the solvent during the treatment step (ii).

In case the deactivated catalyst particles are subjected to treatment step (c) ex situ, the treatment step of these particles may performed using a pore fill method. This may be performed by filling a container comprising the catalyst particle(s) to a certain level with the solvent, and in a next step removing the excess liquid. Additionally or alternatively, pore fill may be obtained in the ex situ process by impregnating the catalyst particle(s) with the solvent using an incipient wetness technique, for example by adding just enough liquid to fill the pores. Alternatively, all or a part of the catalyst particle(s) is/are fully immersed in the solvent during treatment step (c).

In case a pore fill method is applied, treatment step (ii) or (c) may comprise two steps. In step (ii)a or (c)I pores of the catalyst particle(s) are filled using a pore fill method. In step (ii)b or (c)II the solvent in the pores is left in the pores for more than 5 minutes.

In step (ii)a or (c)I, pore fill may be achieved as described above by filling a reactor tube comprising the catalyst particle(s) to a certain level with the solvent, and in a next step removing the excess liquid. The pores are preferably filled in step (ii)a or (c)I at a temperature in the range of from 5 to 40° C., more preferably at a temperature in the range of from 15 to 30° C.

Step (ii) b or (c)II is preferably performed at a temperature between 5 and 90° C., more preferably at a temperature between 40 and 70° C., even more preferably at a temperature between 50 and 60° C.

Treatment step (ii) or (c) preferably is performed while excluding oxygen from the (part of the) catalyst particle(s) that is/are being treated. The (part of the) catalyst particle(s) that is/are being treated is/are not contacted with any oxidant-containing gas during treatment step (ii) or (c).

In case of one or more immobilised slurry particles, the reactor tube or container comprising the immobilised slurry catalyst particle(s) may be filled with solvent to a certain level, and the part to be treated may then kept immersed in the solvent during the treatment step (ii) or (c). The (part of the) catalyst particle(s) that is/are immersed in the solvent is excluded from oxygen during treatment step (ii) or (c). The (part of) the catalyst particle(s) that is/are immersed in the solvent is also excluded from any oxidant-containing gas during treatment step (ii) or (c).

In case a pore fill method is applied to one or more fixed bed catalyst particles or to a (part of) one or more immobilized slurry particles, preferably treatment step (ii) or (c) is performed by filling the reactor tube or container comprising the catalyst particle(s) to a certain level with the solvent, and in a next step removing the excess liquid. The access of oxygen to the (part of the) catalyst particle(s) that is being treated may, for example, be excluded by feeding an inert gas, preferably nitrogen, to the reactor tube or container when excess liquid is removed from the catalyst particle(s). An inert gas, preferably nitrogen, is preferably used to remove excess liquid from the catalyst particle(s).

In case a pore fill method is applied to one or more fixed bed catalyst particles or to a (part of) one or more immobilized slurry particles in the ex situ process, preferably pore fill is performed by impregnating the catalyst particle(s) with the solvent using an incipient wetness technique, for example by adding just enough liquid to fill the pores. An inert gas, preferably nitrogen, may be used to exclude oxygen during treatment step (c). The catalyst particle(s) preferably are excluded from any oxidant-containing gas during treatment step (c).

In case the catalyst particles to be treated are kept immersed in the liquid during step (c), they are excluded from oxygen during treatment step (c). The catalyst particle(s) that is/are immersed in the solvent is/are also excluded from any oxidant-containing gas during treatment step (c).

The drying step (iii) or (d) may, for example, be performed using air or an inert gas, preferably inert gas. Drying may take place at room temperature or at an elevated temperature. Additionally or alternatively, the catalyst particle may be heated before, during, and/or after the drying. During step (iii) or (d), the catalyst preferably is subjected to air or inert gas having a temperature between 70 and 300° C., more preferably between 80 and 120° C., even more preferably between 85 and 95° C. Optionally, the catalyst is calcined during or after the drying step (iii) or (b).

According to a further aspect of the present invention, Fischer-Tropsch synthesis product is removed from the particle(s) before applying one of the processes of the current invention.

Fischer-Tropsch synthesis product is preferably removed from the deactivated catalyst in situ in the reactor. This may be performed by washing the catalyst with a hydrocarbon that is lighter than the Fischer-Tropsch synthesis product. For example, Fischer-Tropsch wax may be removed by washing with gas oil; the gas oil may be petroleum gas oil, or preferably, a synthetic gas oil, for example a gas oil produced using Fischer-Tropsch synthesis. After this removal step, the reactor tube preferably comprises less than 30 grams hydrocarbons per 100 grams catalyst particles, more preferably less than 10 grams hydrocarbons per 100 grams catalyst particles, most preferably less than 5 grams hydrocarbons per 100 grams catalyst particles. In a next step oxidation step (i) or (a) is performed.

The present invention also provides a regenerated catalyst that can be obtained by the regeneration processes of the current invention. The present invention also provides a process comprising the use of a catalyst according to the invention in a Fischer-Tropsch synthesis process.

It has now been found with the processes according to the present invention, the activity of a deactivated, or spent, catalyst can be increased significantly.

The oxidation step(s) may be performed by treating the catalyst with an oxygen-containing gas at the above-indicated temperatures. A reduction step may be performed by contacting the catalyst with hydrogen or a hydrogen-containing gas, typically at temperatures of about 200 to 350° C.

A Fischer-Tropsch catalyst or catalyst precursor comprises a catalytically active metal or precursor therefor, and optionally promoters, supported on a catalyst carrier. The catalyst carrier in this case preferably comprises a refractory metal oxide, more preferably alumina, silica, titania, or mixtures thereof, most preferably porous titania. Preferably more than 70 weight percent of the carrier material consists of refractory metal oxide, more preferably more than 80 weight percent, most preferably more than 90 weight percent, calculated on the total weight of the carrier material. As an example of a suitable carrier material can be mentioned the commercially available Titanium Dioxide P25 ex Evonik Industries.

The carrier may comprise titania and another refractory metal oxide or silicate or combinations thereof. Examples of suitable carrier materials that may be present in the catalyst in addition to titania include: silica, alumina, zirconia, ceria, gallia and mixtures thereof, especially silica and alumina.

The catalytically active metal in the catalyst is cobalt. Cobalt may be added to the carrier in the form of, for example, cobalt hydroxide, CoOOH, cobalt oxide, a co-precipitate of cobalt and manganese hydroxide, a cobalt nitrite, or a cobalt ammonium complex, for example cobalt ammonium carbonate. The catalyst may also include one or more further components, such as promoters and/or co-catalysts.

Suitable co-catalysts include one or more metals such as iron, nickel, or one or more noble metals from Group 8-10 of the Periodic Table of Elements. Preferred noble metals are platinum, palladium, rhodium, ruthenium, iridium and osmium. Such co-catalysts are usually present in small amounts.

References to "Groups" and the Periodic Table as used herein relate to the new IUPAC version of the Periodic Table of Elements such as that described in the 87th Edition of the Handbook of Chemistry and Physics (CRC Press).

Typically, the amount of catalytically active metal present in the catalyst may range from 1 to 100 parts by weight per 100 parts by weight of carrier material, preferably from 3 to 50 parts by weight per 100 parts by weight of carrier material.

The catalyst may further comprise one or more promoters. One or more metals or metal oxides may be present as promoters, more particularly one or more d-metals or d-metal oxides. Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters. Suitable metal promoters may be selected from Groups 7-10 of the Periodic Table of Elements.

Manganese, iron, rhenium and Group 8-10 noble metals are particularly suitable as promoters, and are preferably provided in the form of a salt or hydroxide.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

One particularly preferred Fischer-Tropsch catalyst comprises a manganese or vanadium promoter.

When fresh prepared, the catalyst may have been shaped or formed by means of spray drying, pelletizing, (wheel) pressing, extrusion, or application on a metal support (like a metal wire). The catalytically active metal and/or any promoter may have been added to the carrier material before or after shaping.

For example, in case of fixed bed particles, a cobalt compound, preferably cobalt hydroxide, CoOOH, cobalt oxide, or a co-precipitate of cobalt and manganese hydroxide, may be mixed with a refractory metal oxide, followed by extrusion. Or, a refractory metal oxide may be extruded, and in a later step the extrudates may be impregnated with a cobalt compound, preferably with a cobalt salt that is soluble in water and/or ethanol.

When a carrier material is shaped, it may be advantageous to add a binder material, for example to increase the mechanical strength of the catalyst or catalyst precursor. Additionally or alternatively, a liquid may be added to the carrier material before or during its shaping. The liquid may be any of suitable liquids known in the art, for example: water; ammonia, alcohols, such as methanol, ethanol and propanol; ketones, such as acetone; aldehydes, such as propanol and aromatic solvents, such as toluene, and mixtures of the aforesaid liquids. A most convenient and preferred liquid is water. The liquid may include viscosity improvers such as a polyvinylalcohol.

In case of extrusion, one may want to improve the flow properties of the carrier material. In that case it is preferred to include one or more flow improving agents and/or extrusion aids prior to extrusion. Suitable additives include fatty amines, quaternary ammonium compounds, polyvinyl pyridine, sulphoxonium, sulphonium, phosphonium and iodonium compounds, alkylated aromatic compounds, acyclic mono-carboxylic acids, fatty acids, sulphonated aromatic compounds, alcohol sulphates, ether alcohol sulphates, sulphated fats and oils, phosphonic acid salts, polyoxyethylene alkylphenols, polyoxyethylene alcohols, polyoxyethylene alkylamines, polyoxyethylene alkylamides, polyacrylamides, polyols and acetylenic glycols. Preferred additives are sold under the trademarks Nalco and Superfloc.

To obtain strong extrudates, it is preferred to include, prior to extrusion, at least one compound which acts as a peptising agent for the refractory metal oxide. For example, a peptising agent for titania may be included prior to extrusion. Suitable peptising agents are well known in the art and include basic and acidic compounds. Examples of basic compounds are ammonia, ammonia-releasing compounds, ammonium compounds or organic amines. In case of a calcination step after shaping, such basic compounds are removed upon calcination and are not retained in the extrudates. This is advisable as such basic compounds may impair the catalytic performance of the final product. Preferred basic compounds are organic amines or ammonium compounds. A most suitable organic amine is ethanol amine. Suitable acidic peptising agents include weak acids, for example formic acid, acetic acid, citric acid, oxalic acid, and propionic acid.

Optionally, burn-out materials may be included prior to extrusion, in order to create macropores in the resulting extrudates. Suitable burn-out materials are commonly known in the art.

The total amount of flow-improving agents/extrusion aids, peptising agents, and burn-out materials in the carrier material to be extruded preferably is in the range of from 0.1 to 20% by weight, more preferably from 0.5 to 10% by weight, on the basis of the total weight of the mixture.

After shaping, the carrier material, optionally including further components, may be strengthened by calcination thereof in a manner known in the art. The calcination temperature depends on the carrier material used. Titania is preferably calcined at a temperature between 350 and 700° C., more preferably between 400 and 650° C., more preferably between 450 and 600° C. A calcination step is nevertheless optional, especially when preparing a Fischer-Tropsch catalyst comprising titania and cobalt.

Activation of a fresh prepared catalyst, whether it is a powder like slurry catalyst, fixed bed catalyst, or immobilised slurry catalyst, can be carried out in any known manner and under conventional conditions. For example, the catalyst may be activated by contacting it with hydrogen or a hydrogen-containing gas, typically at temperatures of about 200° to 350° C.

The catalyst that is subjected to the process of the current invention has been deactivated by use in a Fischer-Tropsch process.

The Fischer-Tropsch process is well known to those skilled in the art and involves synthesis of hydrocarbons from syngas, by contacting the syngas at reaction conditions with the Fischer-Tropsch catalyst.

The synthesis gas can be provided by any suitable means, process or arrangement. This includes partial oxidation and/or reforming of a hydrocarbonaceous feedstock as is known in the art. To adjust the $H_2/CO$ ratio in the syngas, carbon dioxide and/or steam may be introduced into the partial oxidation process. The $H_2/CO$ ratio of the syngas is suitably between 1.5 and 2.3, preferably between 1.6 and 2.0.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

A steady state catalytic hydrocarbon synthesis process may be performed under conventional synthesis conditions known in the art. Typically, the catalytic conversion may be effected at a temperature in the range of from 100 to 600° C., preferably from 150 to 350° C., more preferably from 175 to 275° C., most preferably 200 to 260° C. Typical total pressures for the catalytic conversion process are in the range of from 5 to 150 bar absolute, more preferably from 5 to 80 bar absolute. In the catalytic conversion process mainly $C_5+$ hydrocarbons are formed.

A suitable regime for carrying out the Fischer-Tropsch process with a catalyst comprising particles with a size of at least 1 mm is a fixed bed regime, especially a trickle flow regime. A very suitable reactor is a multitubular fixed bed reactor.

Experimental
Measurement Method; Activity

Catalytic activities can be measured, for example, in a model Fischer-Tropsch reactor. The catalytic activities measured may be expressed as space time yield (STY) or as an activity factor, whereby an activity factor of 1 corresponds to a space time yield (STY) of 100 g/l.hr at 200° C.

Sample Preparation

Fixed bed particles were prepared as follows. A mixture was prepared containing titania powder, cobalt hydroxide, manganese hydroxide, water and several extrusion aids. The mixture was kneaded for and shaped using extrusion. The extrudates were dried and calcined. The obtained catalyst (precursor) contained about 20 wt % cobalt and about 1 wt % of manganese.

This catalyst was used in a Fischer-Tropsch process for several years. Thereafter, Fischer-Tropsch product was removed from the deactivated, or spent, catalyst using gas oil that was prepared in a Fischer-Tropsch process. In a next step the deactivated catalyst was treated with a hydrogen comprising gas for several hours at an elevated temperature. The deactivated catalyst was oxidised at a temperature of 270° C. The reactor was unloaded and samples of the deactivated catalyst particles were obtained.

During unloading, portions from different locations in the reactor were collected. Some of the samples were not treated according to the present invention (comparative examples), and other samples were treated according to the invention (example 1 and example 2). For comparative example 1 and example 1, samples were taken from the bottom end of reactor tubes. For comparative example 2 and example 2, samples were taken from different locations in reactor tubes.

COMPARATIVE EXAMPLE 1A

Untreated sample as described under "sample preparation".

COMPARATIVE EXAMPLE 1B

Ammonium Hydroxide Treatment

A solution of ammonium hydroxide, ammonium carbonate and water was prepared. Samples of deactivated fixed bed particles, prepared as indicated above, were treated with these mixtures using a pore fill method.

Pores of the fixed bed particles were filled with solvent during treatment step (c) by adding just enough solvent to fill the pores. The particles were not immersed in the solvent. The pore-filled particles were left for two hours at room temperature. In a next step the temperature was increased to about 50° C. or 60° C., and the particles were left at that temperature for about 5 hours. In a further step the samples were dried at 60° C. under vacuum overnight and then calcined at 300° C. for 2 hours.

EXAMPLE 1

According to "Ex Situ Process"

A solution of methylamine was added to a solution of ammonium carbonate in water. Various mixtures were prepared with different concentrations. Samples of deactivated fixed bed particles, prepared as indicated above, were treated with these mixtures using a pore fill method.

Pores of the fixed bed particles were filled with solvent during treatment step (c) by adding just enough solvent to fill the pores. The particles were not immersed in the solvent. The pore-filled particles were left for two hours at room temperature. In a next step the temperature was increased to about 50° C. or 60° C., and the particles were left at that temperature for about 5 hours. In a further step the samples were dried at 60° C. under vacuum overnight and then calcined at 300° C. for 2 hours.

ACTIVITY MEASUREMENTS EXAMPLE 1 AND COMP. EXAMPLES 1A&B

Samples from the comparative examples and samples from example 1 were reduced with a hydrogen comprising gas, and then the activity of the samples was determined. The activity measurements were performed using a Fischer-Tropsch reaction at a temperature of 225° C. and a total pressure of 60 bar abs. Table 1 shows the measurement results.

TABLE 1

| | Oxidation temperature in step (a) | Mixture composition in treatment step (c) | | | Relative activity |
|---|---|---|---|---|---|
| | | $CH_3NH_3OH$ | $(NH_4)_2CO_3$ | pH | |
| Example 1A | 270° C. | 2 | 1 | 11.7 | 369% |
| Example 1B | 270° C. | 1 | 1 | 10.6 | 493% |
| Example 1C | 270° C. | 2 | 1.5 | 11.1 | 528% |
| | | $NH_4OH$ | $(NH_4)_2CO_3$ | pH | |
| Comparative Example 1b | 270° C. | 2 | 1 | 10.7 | 576% |
| Comparative example 1a | 270° C. | — | | | 100% |

From the results it is clear that treatment of deactivated fixed bed catalyst particles according to the present invention results in a significant increase in activity in the Fischer-Tropsch process as compared to untreated particles.

Treatment with a mixture of ammonium hydroxide, ammonium carbonate and water also results in a significant increase in Fischer-Tropsch activity.

COBALT SOLUBILITY MEASUREMENTS EXAMPLE 1 AND COMPARATIVE EXAMPLE 1C

Tests were performed to determine the amount of cobalt that dissolves in treatment solutions at 20° C.

A solution of methylamine was added to a solution of ammonium carbonate in water. Various mixtures were prepared with different concentrations.

Also a solution was prepared from ammonium hydroxide, ammonium carbonate and water (comparative example 1c).

Samples of deactivated fixed bed particles as described under "sample preparation" were subjected to a cobalt solubility test. From every sample 0.5 gram of deactivated fixed bed particles was added to 1 mL of solution. The particles were kept in the solutions at 20° C. Samples of these solutions were taken after 4 hours and diluted with a nitric acid solution (1M).

The amount of dissolved cobalt in the solution of ammonium hydroxide, ammonium carbonate and water (comparative example) was determined with Inductive Coupled Plasma (ICP) in combination with Atomic Emission Spectroscopy (AES).

The amount of cobalt dissolved in the other solutions was measured with the cobalt strip test method. In this method the solution of cobalt was acidified with diluted nitric acid (1M) to a pH in the range of from 1 to 6. The cobalt sensitive zone of the strip was immersed in the solution for 1 second and after 15 seconds the reacted part of the strip was compared with the color scale on the strips container to determine the concentration of cobalt.

Table 2 shows the amount of dissolved cobalt calculated on the total amount of cobalt present in the particles.

TABLE 2

| | Oxidation temperature in step (a) | Mixture composition in cobalt solubility test | | | Amount of dissolved Co (wt %) |
|---|---|---|---|---|---|
| | | $CH_3NH_3OH$ | $(NH_4)_2CO_3$ | pH | |
| Example 1D | 270° C. | 2 | 1 | 11.7 | 0.05 |
| Example 1E | 270° C. | 1 | 1 | 10.6 | 0.30 |
| Example 1F | 270° C. | 2 | 1.5 | 11.1 | 0.05 |
| | | $NH_4OH$ | $(NH_4)_2CO_3$ | pH | |
| Comparative Example 1c | 270° C. | 2 | 1 | 10.7 | 5 (ICP-AES) |

From the results it is clear that treatment of deactivated fixed bed catalyst particles according to the present invention results in a lower cobalt solubility as compared to deactivated fixed bed catalyst particles treated with a mixture of ammonium hydroxide, ammonium carbonate and water.

EXAMPLE 2

Samples taken from different locations in reactor tubes, see "sample preparation", were used to load carbon steel test tubes. Deactivated fixed bed particles that were taken from the top of the reactor were placed at the top in these test tubes. Deactivated fixed bed particles that were taken from the bottom of the reactor were placed at the bottom in these test tubes.

COMPARATIVE EXAMPLE 2

Ammonium Hydroxide Treatment

Some test tubes were treated with a solution of ammonium hydroxide, ammonium carbonate and water. The solution comprises much less ammonium hydroxide then in comparative examples 1b and 1c. The full catalyst bed in the test tubes was treated in comparative example 2.

The catalyst bed was filled from the bottom end to the top with a mixture of ammonium hydroxide, ammonium carbonate and water at room temperature in one hour. The excess liquid was drained followed by purging the bed with nitrogen for two minutes. From the drained liquid a sample was taken to determine the solubility of cobalt and iron in the mixtures with the ICP-AES method, as described for example 1.

TREATMENT EXAMPLE 2

According to "In Situ Process"

Some test tubes were treated according to the invention. The full catalyst bed in the test tubes was treated.

The catalyst bed was filled from the bottom end to the top with a mixture of ammonium carbonate, methylamine and water at room temperature in one hour. The excess liquid was drained followed by purging the bed with nitrogen for two minutes. From the drained liquid a sample was taken to determine the solubility of cobalt and iron in the mixtures with the ICP-AES method, as described for example 1.

Table 2a shows the amount of dissolved cobalt dissolved, calculated on the total amount of cobalt in the fixed bed catalyst particles. Table 2 also shows the amount of dissolved iron in ppm. The iron is mainly coming from the carbon steel test tube.

TABLE 2a

| | Oxidation temperature in step (i) | Mixture composition in cobalt and iron solubility tests | | | Amount of dissolved Co (wt %) | Amount of dissolved Fe (ppm) |
|---|---|---|---|---|---|---|
| | | $CH_3NH_3OH$ | $(NH_4)_2CO_3$ | $H_2O$ | | |
| Example 2 | 270° C. | 2 | 1.5 | 2 | 0.54 | 248 |
| | | $NH_4OH$ | $(NH_4)_2CO_3$ | $H_2O$ | | |
| Comparative Example 2 | 270° C. | 1 | 1 | 2 | 0.66 | 419 |

From the results it is clear that treatment of deactivated fixed bed catalyst particles according to the present invention still results in a lower cobalt solubility as compared to deactivated fixed bed catalyst particles treated with a mixture of ammonium hydroxide, ammonium carbonate and water, even when a solution comprising a very low amount of ammonium hydroxide is used.

Additionally, the amount of iron which dissolves in the process in according to the present invention is much less than the amount of iron which dissolves in a mixture of ammonium hydroxide, ammonium carbonate and water.

Hence, one advantage of the "in situ process" according to the present invention is that only a small amount of cobalt may be washed out during the treatment step. Another advantage of the "in situ process" according to the present invention is that the reactor tube, when made of an iron comprising metal, such as carbon steel, will hardly suffer from the treatment step.

What is claimed is:

1. A process for regenerating one or more cobalt comprising Fischer-Tropsch catalyst particles in situ in a reactor tube, said catalyst particle(s) having been deactivated by use in a Fischer-Tropsch process, said process for regenerating comprising the steps of:
   (i) oxidising the catalyst particle(s) at a temperature between 20 and 400° C.;
   (ii) treating the catalyst particle(s) for more than 5 minutes with a solvent, which solvent comprises ammonium carbonate and an amine selected from the group consisting of methylamine, ethylamine, propylamine, butylamine and mixtures thereof;
   (iii) drying the catalyst particle(s); and
   (iv) reducing the catalyst particle(s) with hydrogen or a hydrogen comprising gas.

2. The process according to claim 1, wherein treatment step (ii) comprises the steps of:
   (ii)a filling pores of the catalyst particle(s) with a solvent at a temperature in the range of from 5 to 40° C. using a pore fill method;
   (ii)b leaving the solvent in the pores for more than 5 minutes at a temperature between 5 and 90° C.

3. The process according to claim 1, wherein the catalyst particle(s) is/are reduced with hydrogen or a hydrogen comprising gas after the oxidation step and before the treatment step (ii).

4. The process according to claim 1, wherein the solvent used in step (ii) additionally comprises one or more chemical compounds chosen from the group consisting of nitric acid, weak organic acids, ammonium salts, and alkyl ammonium salts.

5. The process according to claim 1, wherein the solvent used in step (ii) comprises ammonium carbonate and methylamine.

6. The process according to claim 1, wherein the solvent used in step (ii) comprises a mixture of ammonium carbonate, methyl amine and water.

7. The process according to claim 1, wherein the solvent used in step (ii) comprises a mixture of ammonium carbonate, methyl amine and water, with a weight ratio of the methylamine to the ammonium carbonate in the range of from 1:0.25 to 1:2, and/or with a weight ratio of the ammonium carbonate to water in the range of from 1:0.5 to 1:4, and/or with a weight ratio of the methylamine to water in the range of from 1:0.25 to 1:4.

8. The process according to claim 1, wherein the catalyst particle(s) is/are fixed bed particle(s) larger than 1 mm or immobilised slurry particle(s) larger than 1 mm.

9. The process according to claim 8, wherein at least 20% of the catalyst particle(s) is treated, and whereby the at least 20% of the catalyst particle(s) is located at a downstream end of the reactor tube and is subjected to step (ii).

10. A process for regenerating one or more cobalt comprising Fischer-Tropsch catalyst particles, said catalyst particle(s) having been deactivated by use in a Fischer-Tropsch process in a reactor tube, said process for regenerating comprising the steps of:
    (a) oxidising the catalyst particle(s) in the reactor tube at a temperature between 20 and 400° C.;
    (b) unloading the catalyst particle(s) from the reactor tube;
    (c) treating catalyst particle(s) for more than 5 minutes with a solvent, which solvent comprises ammonium carbonate and an amine selected from the group consisting of methylamine, ethylamine, propylamine, butylamine and mixtures thereof;
    (d) drying and optionally heating the catalyst particle(s).

11. The process according to claim 10, wherein treatment step (c) comprises the steps of:
    (c)I filling pores of the catalyst particle(s) with a solvent at a temperature in the range of from 5 to 40° C. using a pore fill method;
    (c)II leaving the solvent in the pores for more than 5 minutes at a temperature between 5 and 90° C.

12. The process according to claim 10, wherein the catalyst particle(s) is/are reduced with hydrogen or a hydrogen comprising gas after the oxidation step and before the treatment step (c).

13. The process according to claim 10, wherein the solvent used in step (a) additionally comprises one or more chemical compounds chosen from the group consisting of nitric acid, weak organic acids, ammonium salts, and alkyl ammonium salts.

14. The process according to claim 10, wherein the solvent used in step (c) comprises ammonium carbonate and methylamine.

15. The process according to claim 10, wherein the solvent used in step (c) comprises a mixture of ammonium carbonate, methyl amine and water.

16. The process according to claim 10, wherein the solvent used in step (c) comprises a mixture of ammonium carbonate, methyl amine and water, with a weight ratio of the methylamine to the ammonium carbonate in the range of from 1:0.25 to 1:2, and/or with a weight ratio of the ammonium carbonate to water in the range of from 1:0.5 to 1:4, and/or with a weight ratio of the methylamine to water in the range of from 1:0.25 to 1:4.

17. The process according to claim 10, wherein the catalyst particle(s) is/are fixed bed particle(s) larger than 1 mm or immobilised slurry particle(s) larger than 1 mm.

18. The process according to claim 17, wherein at least 20% of the catalyst particle(s) is treated, and whereby the at least 20% of the catalyst particle(s) is located at a downstream end of the reactor tube and is subjected to step (c).

* * * * *